Figure 1:
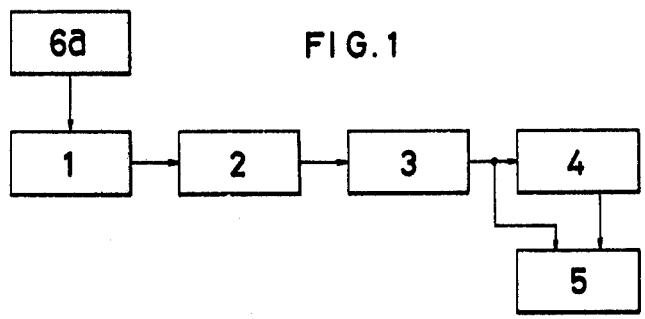

United States Patent [19]

Ozawa

[11] 4,262,193
[45] Apr. 14, 1981

[54] PHOTOGRAPH MULTIPLYING FACTOR AUTOMATIC-COUNTING SCALE

[76] Inventor: Tadae Ozawa, 62 Toyosatosugahara-cho, Higashiyodogawaku, Osaka, Japan

[21] Appl. No.: 7,221

[22] Filed: Jan. 29, 1979

[30] Foreign Application Priority Data

Sep. 22, 1978 [JP] Japan ............................... 53-132352

[51] Int. Cl.³ .......................... G06M 3/14; G01B 7/00
[52] U.S. Cl. ........................... 235/92 DN; 235/92 MP; 235/92 DM; 364/561
[58] Field of Search ....... 235/92 DM, 92 DN, 92 CP, 235/92 MP, 92 GC; 364/561, 562, 563, 705; 33/142, 125 C

[56] References Cited

U.S. PATENT DOCUMENTS

| 3,882,302 | 5/1975 | Deichmiller et al. ........... 235/92 DN |
| 3,955,073 | 5/1976 | Carew et al. ....................... 364/561 |
| 3,965,340 | 6/1976 | Renner et al. .................. 235/92 DM |

Primary Examiner—Joseph M. Thesz
Attorney, Agent, or Firm—George B. Oujevolk

[57] ABSTRACT

A photograph multiplying factor automatic-counting scale including a scale head linearly movable, a pulse generator generating pulse signal per unit length in proportion to movement of said scale head, a BCD counter through which said pulse signal from said pulse generator is converted into BCD code and counted, an interface circuit into which output value from said BCD counter is fed through a BCD decimal converter, and an arithmetic circuit into which output value from said interface circuit is fed through output of a program starting button, so that a length measuring apparatus including said scale head may obtain original dimensions as divisor, whereby said arithmetic circuit divides finished dimensions by said original dimensions and the quotient obtained by said arithmetic circuit is displayed or printed out.

1 Claim, 6 Drawing Figures

PHOTOGRAPH MULTIPLYING FACTOR AUTOMATIC-COUNTING SCALE

This invention relates to a photograph multiplying factor automatic-counting scale, which obtains original and finished photograph dimensions in digital amounts by use of an electrically length measuring apparatus, the digital amounts of both the dimensions being put into operation to thereby display or print the finished photograph enlarging multiplying factor.

Generally, this kind of finished photograph enlarging multiplying factor is transferred to a working process after original and finished photograph dimensions are actually measured, entered into a paper, divided by a slide rule or calculator, and the result of division are recorded. This method has been very inefficient due to frequent errors in record or measurement especially in phototype businesses dealing with numerous multiplying factors.

In view of the aforesaid drawbacks, this invention has been designed. An object of the invention is the provision of a counting scale capable of automatically electrically and electronically measuring and calculating the photograph dimensions and of outputting the calculation results similarly in automatic display or printing, thereby eliminating the conventional defects as aforegoing.

Another object of the invention is the provision of a counting scale comprising; an electrical length-measuring apparatus including a scale body, a scale head through which the scale body is linearly movable, switching means turned on and off at the initial starting point, i.e., the measuring reference point, and the measuring end of the scale head respectively, and a program starting switch button; and a control box including a signal process control arithmetic unit and display unit, connected to the electrical length-measuring apparatus by means of a code.

Figure 2:
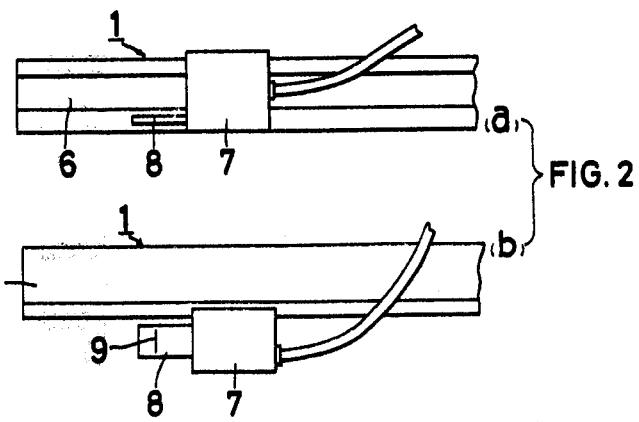
Figure 3:
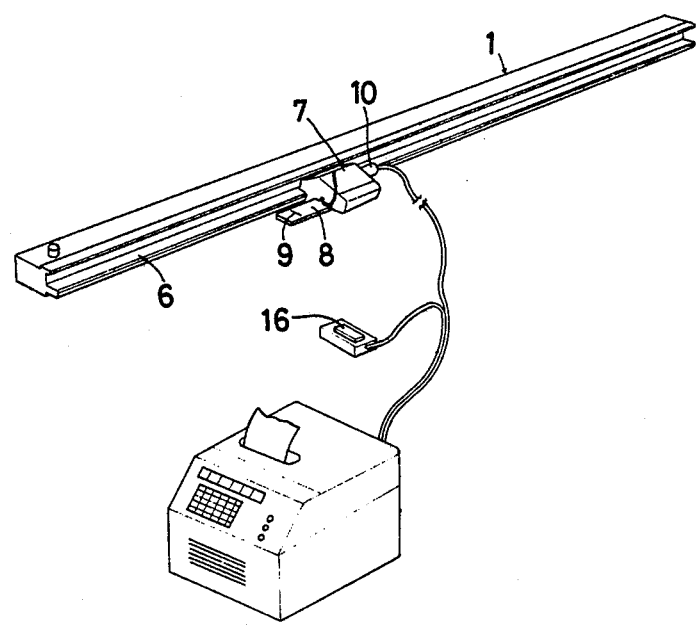
Figure 4:
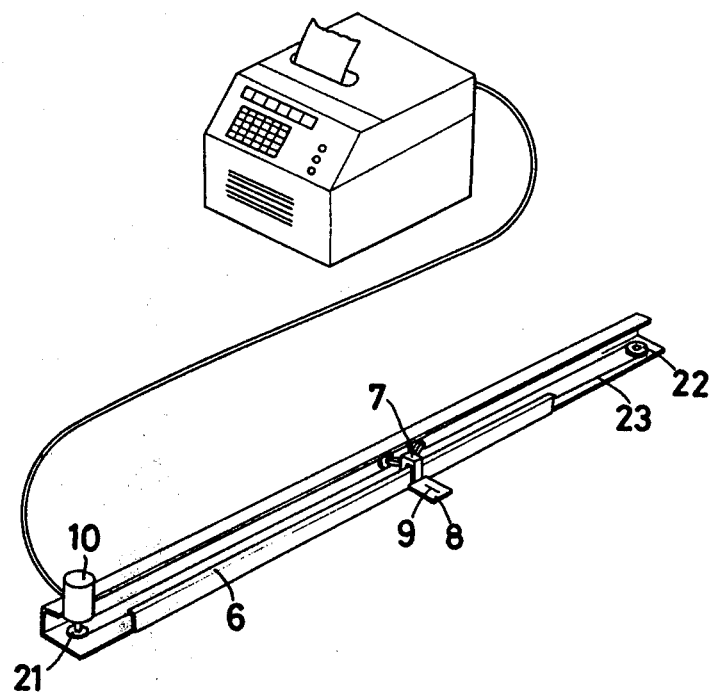
Figure 5:
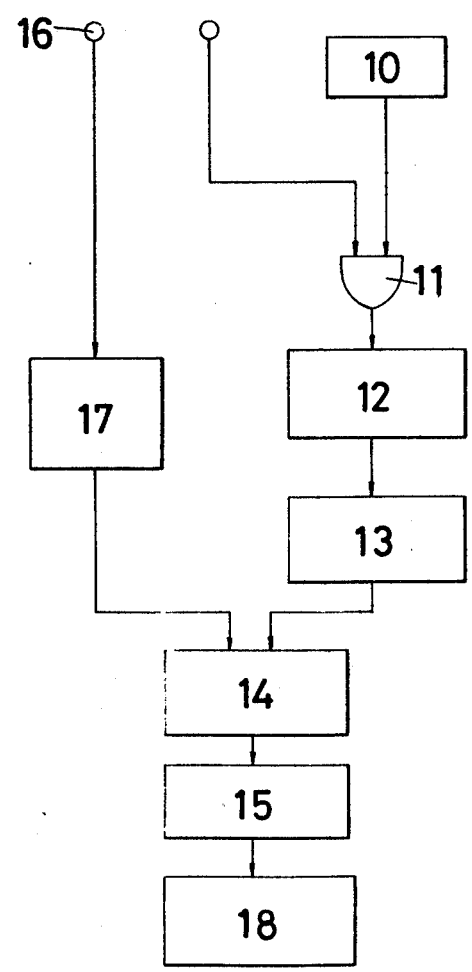

These and other objects of the invention will become more apparent in the detailed description in accordance with the accompanying drawings, in which;

FIG. 1 is a block diagram of an embodiment of the photograph multiplying factor automatic-counting scale of the invention, FIGS. 2(a) and 2(b) represent a part of a length measuring apparatus, in which FIG. 2(a) is a partially front view thereof, and FIG. 2(b) is a plan view of the same, FIG. 3 is a perspective view of a modified embodiment of the invention, FIG. 4 is a perspective view of a length measuring apparatus of another modified embodiment, and FIG. 5 is a block diagram of the modified embodiment in FIG. 3.

An embodiment of the invention is shown by its block diagram in FIG. 1 and comprises a length-measuring apparatus 1 obtainable of pulse signal corresponding to, for example, unit amount, an analog-digital converter 2 wherein the output is the measured dimensions as pulse signals, a counter 3 counting output signals from the converter 2, a divider 4 into which the calculated value corresponding to the measurement result obtained by the counter 3 is fed and which divides an initial input value by the following input value to provides an output the quotient, and a printer 5 for displaying or printing the outputs from the counter 3 and divider 4. In this instance the measurement value of original photograph is a divisor and the finished dimension is a dividend, whereby the finished dimension is at first fed and then original dimension is fed into the divider.

Next, function of an embodiment of the invention shown in FIG. 2 will be given in the following detailed description.

The length measuring apparatus 1 has a detecting scale head 7 slidably engaged with a guide scale 6 used as a scale also. The detecting scale head 7 can slide on the guide 6 so that the reference line 9 at a transparent plate 8 projecting from the head 7 may be fit to the measurement reference end of original photograph or finished layout, and then a control button 10a is turned on. The length measuring apparatus 1 and analog-digital converter 2 are so constituted that one pulse digital signal may be obtained with respect to a 0.1 mm travel of the head 7 at the length measuring apparatus 1, thereby enabling the counter 3 to count a measurement value corresponding to one-tenth of the dimension in mm unit.

In general the embodiments shown operate as follows:

Firstly, the guide scale 6 of the length measuring apparatus is placed on the line to be measured at the layout of finished dimensions and the reference line 9 at the head 7 is fit to the initial point of the line to be measured and then the control button 10 is turned on. Upon turn-on of the button 10a the counter 3 is cleared of its former component and reset, thereby starting the count of next dimension measurement signal. The head 7 is moved to allow the terminal of the measured line to fit to the reference line 9, then the control button 10a is turned off, whereby the output value counted by the counter 3 is fed into the divider 4 as a dividend.

Secondly, objective lines at the original photograph are repeatedly measured in similar control and divisors are fed into the divider 4, whereby the divider 4 operates and the results of division are printed by the printer 5.

In addition, the divider 4 may provide a display through a luminescent diode the inputs of divisor and dividend, and perform operations by use of a separate switch.

Next, the modified embodiment shown in FIGS. 3 and 5 will be concretely explained.

The detecting head 7 movable linearly through the scale guide 6 is connected to gate 11 which allows pulse signal from a pulse generator 10 to pass through the gate 11 substantially by output signal from the scale head 7 when starting the dimension measurement. The pulse generator 10 is so constituted as to give, for example, one pulse with respect to a 0.1 mm travel of the head. The gate 11 closes at the end of dimension measurement. Practically, such the method may be constituted to output signals when starting the dimension measurement, but in case that the control button is pushed to be turned on at the initial working point so as to reset the whole circuits, it is useful enough to keep the gate 11 always open, because the pulse generator 10 outputs pulse signals as long as the scale head 7 is moving. Pulse signals passing through the gate 11 are converted into BCD codes and counted at a BCD counter 12. The resultant values are converted at a BCD decimal converter 13 and fed into an arithmetic circuit 15 through an interface 14. A program starting button 16 serves to trigger an operation instruction generator 17 which gives to the arithmetic 15 a command of a symbol of (÷) or (=), such as "the firstly measured length is divided by the secondly measured length and the quotient is equal to", through the interface 14. Thereafter, the results of operation is enough to be obtained by display means 18, such as digital display or print-out. In addition, the interface 14 and other components that follow, when using a table printer system computer, are made considerably easy in constitution.

In addition, the length measuring apparatus 1, whose scale head 7 carries the pulse generator 10 as shown in FIG. 3, is inconvenient in that a code connecting the pulse generator 10 and converter 2 is mobile.

Therefore, a rotary encoder serving also as the pulse generator 10 is, as shown in FIG. 4, provided at one end of the guide scale 6 and one pulley 21 is provided at the encoder and the other pulley 22 at the other end of guide scale 6, so that an endless wire is stretched across both the pulleys 21 and 22 and the scale head 7 is connected to the wire on the way thereof, whereby the pulse generator 10 and converter 2, even when the head 7 moves, is stationary.

As clearly understood from the aforesaid description, the counting scale of the invention employs the relatively simple digital circuit for readily obtaining dimension measurement values and the finished layout dimensions are divided by the original photograph dimensions and the results of division are printed out. Hence the relatively simple construction can obtain the multiplying factor accurately and rapidly in printing, thereby eliminating conventional errors and having the effect of speed-up of works.

While an embodiment of the invention has been shown and described, the invention is not limited to the specific construction thereof, which is merely exemplified in the specification rather than defined.

What is claimed is:

1. In an automatic photograph measurement, multiplying and counting apparatus for providing digital measurements of distances appearing in a photograph, said apparatus having:
   (1) an elongated straight piece (1) for placing on a photograph along a distance to be measured;
   (2) an elongated guide scale (6) coupled to and disposed alongside said piece (1);
   (3) detecting scale head means (7) disposed for slidable engagement along said scale (6) including a control button (10a) thereon;
   (4) a transparent plate (8) projecting from said head means (7) with a reference line (9) thereon to be placed at a reference point on a photograph to be measured;
   (5) a pulse generator coupled to said piece (1) and said button (10a), with gating circuitry providing pulse signals per unit length in proportion to the movement of said head means (7);
   (6) a binary coded decimal counter (3) including conversion in said apparatus coupled to said pulse generator, receiving and counting said pulse signals and converting them into binary coded decimals;
   (7) mathematical circuit means including interface circuitry coupled to the output of said counter (3);
   (8) display means (18) coupled to said mathematical circuit means;
the improvement therein comprising:
   (8) first and second pulleys (21, 22) at one and the other end of said piece and an endless wire between said pulleys;
   (9) a rotary encoder pulse generator acting as said pulse generator, said rotary encoder being mounted at said one end of said piece (1) coupled to and responsive to said first pulley; and,
   (10) said head means being coupled to said wire so that the movement of said head means along said scale turns said rotary encoder to generate pulses.

* * * * *